United States Patent [19]

Force

[11] Patent Number: 4,566,278
[45] Date of Patent: Jan. 28, 1986

[54] METHANE - CARBON DIOXIDE SCRUBBING METHOD AND SYSTEM

[76] Inventor: Louis W. Force, 718 North Dr., New Buffalo, Mich. 49117

[21] Appl. No.: 665,732

[22] Filed: Oct. 29, 1984

[51] Int. Cl.$^4$ ............................................. F01K 23/10
[52] U.S. Cl. ........................................ 60/618; 60/648; 60/655; 60/721; 123/3; 123/527; 261/144; 261/152
[58] Field of Search ................. 60/618, 648, 655, 721; 123/3, 527; 261/144, 152

[56] References Cited

U.S. PATENT DOCUMENTS

| | | | |
|---|---|---|---|
| 3,296,449 | 1/1967 | Plust et al. | 123/3 X |
| 3,928,973 | 12/1975 | Hand | 60/648 |
| 4,087,976 | 5/1978 | Morrow, Jr. et al. | 60/648 |
| 4,418,653 | 12/1983 | Yoon | 123/3 |

*Primary Examiner*—Allen M. Ostrager
*Attorney, Agent, or Firm*—Philip D. Junkins

[57] ABSTRACT

A thermodynamic method and system is described and claimed for up-grading the quality of digester methane gas by removing substantially all of the non-combustible carbon dioxide gas from the digester gas in a scrubbing system operated by the waste heat of an internal combustion engine utilizing the up-graded methane gas as its fuel source and driving a generator to produce electric power. In accordance with the invention, raw digester gas is compressed and blended with relatively cold water (absorbent). The compressed gas-water mixture is scrubbed in a contact tower with the result that an absorbent-condensed gas stream (primarily water and condensed carbon dioxide) is formed. The absorbent-condensed gas stream is removed from the tower, heated and expanded to release the carbon dioxide component of the stream as product $CO_2$ gas. Non-condensible gases (primarily methane) are removed from the contact tower and utilized as up-graded fuel in an internal combustion engine driving a generator to produce power. The engine is water cooled with the result that saturated steam is produced in the cooling system of the engine. The waste heat of the steam is utilized to both generate refrigeration to cool the water absorbent after the release therefrom of product $CO_2$ gas and to heat the absorbent-condensed gas stream before such stream is expanded to release the product $CO_2$ gas. During such utilization the steam is condensed to form water condensate for return to the engine as coolant water.

16 Claims, 1 Drawing Figure

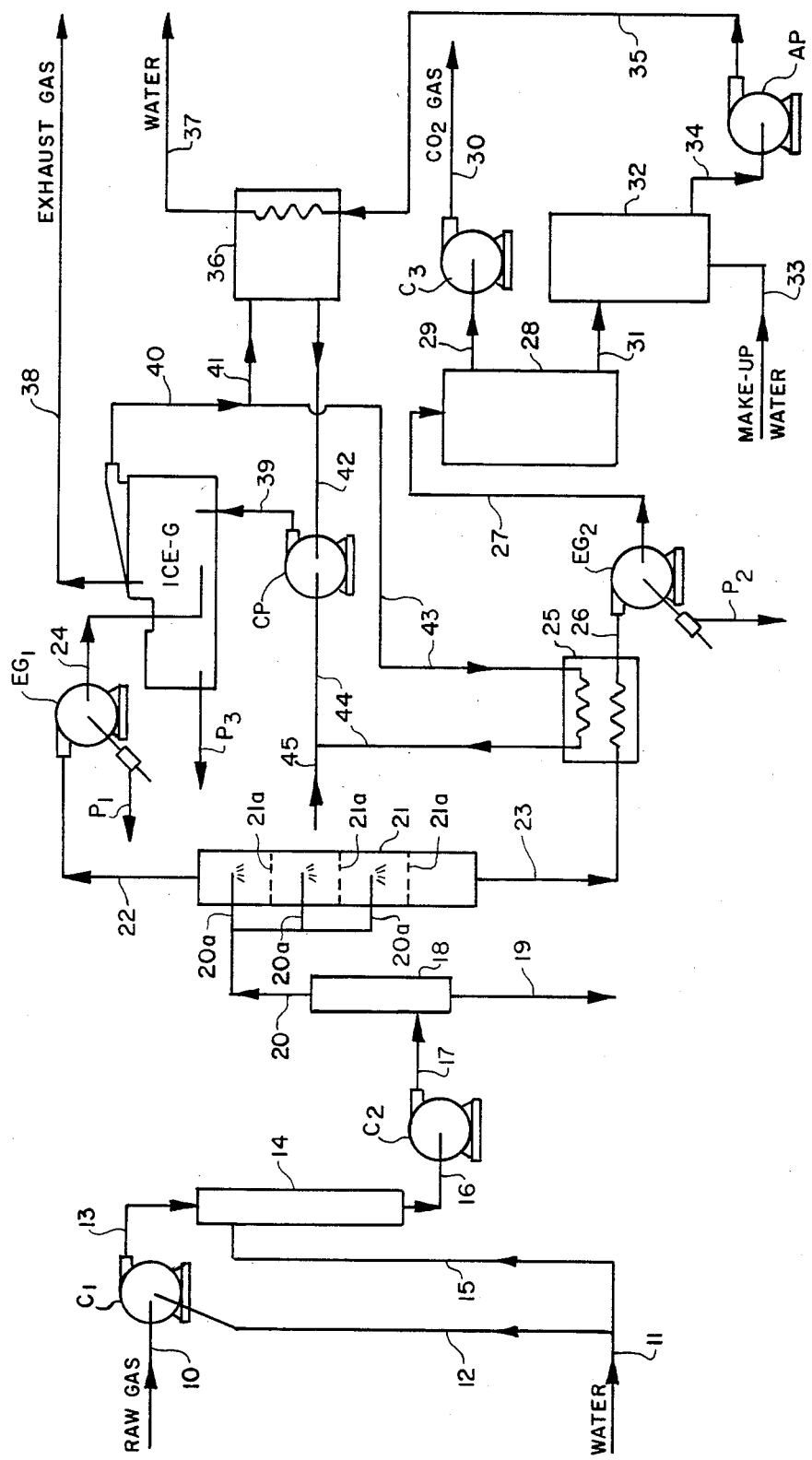

METHANE - CARBON DIOXIDE SCRUBBING METHOD AND SYSTEM

BACKGROUND OF THE INVENTION

The present invention relates to a novel method and system for improving the quality of digester methane gas to enable it to be used effectively and efficiently as a fuel for internal combustion engine - generator systems.

Digester methane gas is generally comprised of a mixture of methane (50–70%), carbon dioxide (30–50%) and varying lesser amounts of oxygen, nitrogen, water, ammonia, hydrogen sulfide and mercaptans and such gas may have a heating value of 400–500 Btu per cubic foot. More typically, digester methane gas is comprised of 52–57% methane, 41–44% carbon dioxide (non-combustible) and 4–7% oxygen, water, ammonia and sulfur compounds. Although it is possible to burn raw digester methane in internal combustion engines, the efficiency of such engines is drastically reduced from that achieved when pipeline methane (1,000 Btu/ft$^3$) is utilized.

SUMMARY OF THE INVENTION

The method and system of the present invention do not attempt to convert digester methane gas into pipeline quality gas for use as a fuel in internal combustion engine - generator systems. Rather, the invention comprises a unique system and methodology for producing up-graded methane fuel (600 to 700) Btu/ft$^3$) by removing substantially all of the non-combustible carbon dioxide gas from the digester methane gas through scrubbing means utilizing waste heat from the engine - generator system in which the up-graded fuel is utilized. The removed carbon dioxide is derived as a marketable industrial-use by-product of the system.

It is an object of the present invention to provide an improved thermodynamic method and system for increasing the quality of digester methane gas for use in internal combustion engine - generator systems producing electric power.

A further object of the invention is to provide an improved thermodynamic method and system for removing substantially all of the non-combustible carbon dioxide component of digester methane gas to produce an up-graded methane fuel for use in internal combustion engine - generator systems producing electric power.

Another object of the invention is to provide an improved thermodynamic method and system for up-grading the quality of digester methane gas by removing the non-combustible carbon dioxide component of such gas in a scrubbing system operated by the waste heat of an internal combustion engine - generator system utilizing the up-graded methane gas as its fuel source.

In accordance with the invention raw digester methane gas (approximately 400 Btu/ft$^3$ of heating value) is compressed and blended with relatively cool process water. The compressed gas-water mixture is scrubbed in a contact tower with the resulting water - condensed gas stream (primarily water and condensed carbon dioxide) further processed to release the carbon dioxide component of the stream as product $CO_2$ and the resulting non-condensible gases (primarily methane) utilized as up-graded fuel in an internal combustion engine - generator system. The engine - generator system is water cooled with the result that saturated steam is produced in the cooling system of the engine - generator system. The saturated steam is utilized to both cool recycled process water used as an absorbant of $CO_2$ during scrubbing of the gas - water mixture in the contact tower and as a heating exchange medium for heating the water and condensed $CO_2$ mixture leaving the contact tower before further processing of such mixture to release the $CO_2$ component as product $CO_2$ gas.

BRIEF DESCRIPTION OF THE DRAWING

The accompanying drawing is a flow sheet diagramatically illustrating one embodiment of the method and system of the present invention.

DESCRIPTION OF THE PREFERRED EMBODIMENT

Referring now to the drawing, there is illustrated a preferred embodiment of the methane - carbon dioxide scrubbing method and system of the invention. According to the invention, raw digester methane gas in feed line 10 is introduced to the system and passed through such line to a gas compressor $C_1$. As previously indicated, the raw digester-generated methane gas comprises a mixture of methane gas, carbon dioxide gas (non-combustible) and small quantities of oxygen, water, ammonia and sulfur compounds with such mixture having a heating value of 400–500 Btu/ft$^3$. A small quantity of relatively cold absorbent fluid (recycled process water containing a small quantity of carbonic acid) in absorbent inlet line 11 is introduced through line 12 to the compressor $C_1$ wherein it is mixed with the raw methane gas. The compressed gas - absorbent mixture leaves compressor $C_1$ through line 13 and is introduced to an in-line motionless blender 14 wherein such mixture is blended with a relatively large quantity of the cold absorbent fluid of inlet line 11 introduced to blender 14 through line 15. A cold blended mixture of absorbent and compressed raw methane gas leaves the motionless blender 14 through outlet line 16 and is introduced to a progressive cavity pump $C_2$ wherein the gas pressure is substantially increased. The cold, high pressure blended mixture of raw methane gas and absorbent fluid leaves pump $C_2$ through line 17 and is passed through filter 18 for the removal of entrained solids. Solid materials, removed from the blended gas - abosrbent mixture in filter 18, are discharged from the filter (with small quantities of water) through line 19 and discarded as waste material.

The cold, high pressure, solids-free blended mixture of raw methane gas and fluid absorbent leaves filter 18 through line 20 and is introduced, at a number of levels through lines 20a, to an absorption-type contact tower (of well known design) 21. In contact tower 21 the mixture is self-scrubbed during its passage over and through contact baffles or trays 21a with the resultant freeing of methane gas (and other non-condensible gases) from the mixture in upward contact flow through the tower and the development of a fluid absorbent mixture including condensed gases (principally condensed carbon dioxide) in downward contact flow through the tower. The high pressure, $CO_2$-free methane gas (with other non-condensible gases) leaves contact tower 21 through overhead line 22 whereas the high pressure fluid absorbent (water) and condensed $CO_2$ mixture leaves such tower through bottoms line 23.

The high pressure, $CO_2$-free methane gas (leaving tower 21 through overhead line 22) is passed through an expander-generator unit $EG_1$ (of well known design) whereby as the gas expands through (and drops in pressure within) the reverse pump or turbine section of the unit $EG_1$ it rotates the mechanically connected generator section of the unit to produce marketable electric power, indicated as product power $P_1$ in the drawing. The expanded methane gas (with other non-condensible gases) leaving expander-generator unit $EG_1$ through line 24 has a heating value of 600–700 Btu/ft$^3$ and comprises a clean gaseous fuel that is well suited to combustion in internal combustion engines such as engines of Otto Cycle design. As shown in the drawing, the digester-derived, clean, higher heating value gaseous fuel in line 24 is introduced to an internal combustion engine - generator unit ICE-G. It is preferred that the pressure of the gaseous fuel during its passage through expender-generator unit $EG_1$ be dropped to no less than 3 or 4 atmospheres so that the fuel is, in effect, turbocharged into the internal combustion engine section of unit ICE-G whereby the engine operates at close to its rated horsepower even though the fuel has a heating value that is lower than that of pipeline methane.

The relatively cold, high pressure absorbent (water) and condensed $CO_2$ mixture leaving the contact tower 21 through bottoms line 23 is heated by passage through heat exchanger 25. Heat exchanger 25 may be of any appropriate indirect heat exchange design and preferrably may be of shell and tube type. The heated, high pressure absorbent - condensed $CO_2$ mixture is passed through line 26 to an expander-generator unit $EG_2$ (of well known design) whereby as the mixture expands through the reverse pump or turbine section of the unit (with vaporization of the $CO_2$ component of the mixture) it rotates the mechanically connected section of the unit to produce marketable electric power, indicated as product power $P_2$ in the drawing. The substantially lower pressure $CO_2$ vapor-absorbent mixture leaving the expander-generator unit $EG_2$ is passed by line 27 to a release tower or desorber unit 28 wherein $CO_2$ gas is, in effect, flashed from the mixture and removed from such tower through line 29 as low pressure $CO_2$ product gas of at least industrial grade quality. The low pressure $CO_2$ gas product in line 29 may be compressed via gas compressor $C_3$ and passed through line 30 to product storage or product use as pressurized $CO_2$ gas. The low pressure, $CO_2$-free water absorbent collected in the lower section of release tower 28 is removed therefrom via line 31 and passed to a surge tank 32. Make-up water (absorbent), as required, may be introduced to the surge tank 32 through line 33.

The relatively warm water absorbent in surge tank 32 is removed through line 34 and pumped under increased pressure via an absorbent pump AP through line 35 to chiller unit 36 wherein the water absorbent stream is cooled prior to its return through line 37 to absorbent inlet line 11 as recycled fluid absorbent for blending with the raw digester-generator methane gas introduced to the system of the invention. The chiller unit 36 is preferably of single effect, steam fired absorption type, as described hereinafter.

Returning now to discussion of the internal combustion engine - generator unit ICE-G, the turbocharged, digester-derived, clean, $CO_2$-free methane fuel introduced to the engine section of unit ICE-G is combusted in the cylinder of such unit and exhausted from the engine section through exhaust gas line 38. The engine section of unit ICE-G is water jacketed for cooling purposes and cooling water (at relatively high temperature) is introduced to the engine's cooling system through line 39 under pressure applied by condensate pump CP. The cooling water is converted to saturated steam during its passage through the engine's cooling system and such steam is removed from the engine section of unit ICE-G through line 40. The internal combustion engine - generator unit ICE-G produces marketable electric power, indicated as product power $P_3$ in the drawing.

In satisfaction of the objectives of the present invention, waste heat from the engine - generator unit ICE-G in the form of the saturated steam and/or super hot water in engine coolant discharge line 40 is utilized as follows to provide the energy for operating the absorption type chiller unit 36 to cool the recycle absorbent (water) in line 35 and for heating the absorbent - condensed $CO_2$ mixture in line 23 during passage of such mixture through heat exchanger 25. Thus, a first portion of the saturated steam and/or super hot water in line 40 is passed by line 41 to the chiller unit 36 wherein the steam (and/or super hot water) is used to generate refrigeration to cool the recycle absorbent in line 35. The engine coolant is also cooled in the chiller unit and such coolant, in the form of condensate, is removed from such unit through line 42 and passed to condensate pump CP for return to the cooling system of the engine - generator unit ICE-G through coolant return line 39. A second portion of super hot water in line 40 is passed by line 43 to heat exchanger 25 wherein the steam (and-/or super hot water) gives up heat to the absorbent (water) and condensed $CO_2$ mixture introduced to such exchanger via line 23. The very hot engine coolant (steam and/or super hot water) portion in line 43 is cooled during its passage through exchanger 25 in indirect heat exchange relationship with the absorbent and $CO_2$ mixture passing through the exchanger and such coolant, in the form of condensate, is removed from the exchanger through line 44 and passed to condensate pump CP for return to the cooling system of engine - generator unit ICE-G through coolant return line 39 with condensate received by such pump from the chiller unit 36 via line 42.

From the above system description it will be appreciated that the engine - generator unit ICE-G, chiller unit 36, heat exchanger 25 and condensate pump CP (with interconnecting steam and condensate transfer lines) combine to form a closed loop of apparatus for effectively utilizing a major portion of the waste heat developed in the internal combustion engine section of the engine - generator unit to accomplish the methane - carbon dioxide scrubbing methodology used to upgrade raw digester methane gas for use as an effecient fuel for power generation. Make-up water may be introduced to this closed loop of apparatus, as required, through line 45.

It should be understood that the waste heat contained in the engine exhaust gas leaving the engine - generator unit ICE-G through line 38 may also be recaptured by the overall system of the invention by introducing such engine exhaust gas to the absorption type chiller unit 36 to generate refrigeration to cool the recycle absorbant in line 35.

Through incorporation of the thermodynamic system and methodology of this invention with respect to the utilization of raw digester-generated methane gas, substantial operational advantages in a gas fueled power generation plant may be gained and heat economies effected. These advantages and economies include: up-grading of raw digester methane gas by carbon dioxide removal and the turbocharging of such $CO_2$-free gas into an internal combustion engine - generator unit to obtain nearly rated horsepower output of the engine of such unit; full utilization of the waste heat of the internal combustion engine; and the recovery of marketable industrial grade carbon dioxide as a by-product of the power generation system fueled with upgraded, digester-derived methane. The following example will further illustrate the nature of the unique thermodynamic system and methodology of the invention, it being understood that the invention is not limited to the operating conditions or quantities therein.

EXAMPLE

A thermodynamic system, including digester gas scrubbing apparatus, heat exchange devices and electric power generation equipment as described above, arranged and interconnected in accordance with the schematic process flow diagram of the drawing, was designed to: receive raw landfill methane gas of relatively low heating value; up-grade the raw methane gas to a higher heating value through the removal of carbon dioxide; use the up-graded methane gas as fuel in a water-cooled internal combustion engine - generator unit to produce electric power; and utilize the waste heat energy generated in the internal combustion engine to accomplish the raw gas up-grading with the co-production of product $CO_2$ gas. The heat, pressure and material balance data and system's performance data are set forth in tabular form below:

| Heat, Pressure and Material Balance & Performance Data | | | | | |
|---|---|---|---|---|---|
| Data Point Description | Pres., psig | Temp., °F. | Gas Flow, scfm | Liquid Flow, gpm | Heat Value Btu/ft$^3$ | Power, mw |
| Line 10 Raw Gas Inlet | 0 | 60 | 1200 | — | 400 | — |
| Line 20 Raw Gas & Absorbant | 350 | 45 | 1200 | 200 | — | — |
| Line 22 $CO_2$ free Fuel | 350 | 45 | 646 | — | 580 | — |
| Line 24 $CO_2$ free Fuel | 50 | 45 | 646 | — | 580 | — |
| Line 23 Absorbant & Cond. $CO_2$ | 350 | 45 | 554 | 200 | — | — |
| Line 29 $CO_2$ Gas Prod. | 10 | 60 | 554 | — | — | — |
| Line 35 Recycle Absorbant | 25 | 60 | — | 200 | — | — |
| Line 37 Recycle Absorbant | 25 | 45 | — | 200 | — | — |
| Line 39 Condensate | 10 | 160 | — | A/R | — | — |
| Line P3 Power Generated | — | — | — | — | — | 3 |

A/R: As Required

From the above data table it will be observed that a raw digester (landfill) methane gas flowing at the rate of 1200 scfm and having a heating value of 400 Btu/ft$^3$, has been up-graded by the removal of carbon dioxide to yield a methane gas having a heating value of 580 Btu/ft$^3$ for efficient use as a fuel (gas flow at the rate of 646 scfm) in an internal combustion engine - generator unit to produce 3 megawatts of electric power. The methodology for removing the carbon dioxide involves use of the waste heat developed in the engine's cooling system and results in the co-production of 554 scfm of industrial grade $CO_2$.

While a preferred embodiment of the invention has been described and an example set forth, it is to be understood that such description and example are merely illustrative of the underlying principles of the invention and are not to be limiting of the scope of the invention and the following claims.

What I claim is:

1. In the method of up-grading the heating value quality of digester generated methane gas by removing carbon dioxide gas therefrom and using the up-graded methane gas as fuel in an internal combustion engine - generator system to produce electric power, the steps comprising:

(a) mixing raw digester methane gas and cold water absorbent under relatively high pressure and introducing the cold gas-absorbant mixture to a contact tower to separate methane gas and other non-condensible gases from said raw digester gas and to condense the carbon dioxide component and other condensible gases of said raw digester gas for absorption by said water absorbant;

(b) removing the methane gas and other non-condensible gases from said contact tower as an overhead gas mixture of higher heating value quality, and utilizing said gas mixture as combustible fuel in the engine of an internal combustion engine - generator system to produce electric power;

(c) removing the water absorbent with absorbed condensed carbon dioxide and other condensed gases from said contact tower as a relatively high pressure bottoms absorbent - condensed gas stream, and heating and expanding said stream to reduce the pressure thereof and vaporize and release carbon dioxide gas and other absorbed gases from said absorbent;

(d) introducing water coolant to the cooling section of the engine of said engine - generator system to cool said engine with the attendant conversion of said coolant to saturated steam;

(e) removing said saturated steam from the cooling section of said engine;

(f) utilizing said steam in part to generate refrigeration to cool the water absorbent after the release therefrom of carbon dioxide gas and other absorbed gases and before the recycle of said absorbent as the cold water absorbent for mixing with raw digester methane gas and in part to heat the bottoms absorbent-condensed gas stream removed from said contact tower before said stream is expanded to release carbon dioxide gas and other absorbed gases therefrom, said utilization of said steam resulting in the cooling thereof to form water condensate; and (g) recycling said water condensate to the cooling section of the engine of said engine - generator system as the water coolant for said engine.

2. In the method of up-grading the heating value quality of digester generated methane gas and using the up-graded gas as fuel in an internal combustion engine - generator system as claimed in claim 1 wherein the overhead gas mixture of higher heating value quality removed from said contact tower is expanded in an expander - generator system before utilization of said gas mixture as combustible fuel whereby the pressure of said mixture is reduced and electric power is generated by said expander - generator system.

3. In the method of up-grading the heating value quality of digester generated methane gas and using the up-graded gas as fuel in an internal combustion engine - generator system as claimed in claim 1 wherein the bottoms absorbent - condensed gas stream, after the heating thereof, is expanded in an expander - generator system whereby the pressure thereof is reduced and electric power is generated by said expander - generator system.

4. In the method of up-grading the heating value quality of digester generated methane gas and using the up-graded gas as fuel in an internal combustion engine - generator system as claimed in claim 3 wherein the reduced pressure absorbent - condensed gas stream is introduced to a desorber vessel wherein carbon dioxide gas and other absorbed gases are released from said absorbent.

5. In the method of up-grading the heating value quality of digester generated methane gas by removing non-combustible carbon dioxide gas therefrom and using the up-graded methane gas as fuel in an internal combustion engine driving an electric generator to produce electric power, the steps comprising:

(a) mixing raw digester methane gas with cold water absorbent;

(b) compressing the water absorbent - gas mixture to relatively high pressure, introducing said compressed absorbent - gas mixture to an absorption-type contact tower and scrubbing said mixture in said tower to separate methane gas and other non-condensible gases from said raw digester gas and to condense the carbon dioxide component and other condensible gases of said raw digester gas for absorption by said water absorbent;

(c) removing from the absorption-type contact tower the methane gas and other non-condensible gases as an overhead gas mixture of higher heating value quality, reducing the pressure of said gas mixture with respect to the pressure within said contact tower and utilizing said gas mixture as combustible fuel in a water-cooled internal combustion engine driving an electric generator to produce electric power;

(d) removing from the absorption-type contact tower the water absorbent with absorbed condensed carbon dioxide and other condensed gases as a relatively high pressure bottoms absorbent - condensed gases stream, and heating and expanding said stream to reduce the pressure thereof and vaporize and release carbon dioxide gas and other absorbed gases from said absorbant;

(e) introducing water coolant to the cooling section of the water-cooled internal combustion engine to cool said engine with the attendant conversion of said coolant to saturated steam;

(f) removing said saturated steam from the cooling section of said engine;

(g) utilizing said steam in part to generate refrigeration to cool the water absorbent after the release therefrom of carbon dioxide gas and other absorbed gases and before the recycle of said absorbent as the cold water absorbent for mixing with raw digester methane gas and in part to heat the bottoms absorbent - condensed gas stream removed from the absorption-type contact tower before said stream is expanded to release carbon dioxide gas and other absorbed gases therefrom, said utilization of said stream resulting in the cooling thereof to form water condensate; and (h) recycling said water condensate to the cooling section of the internal combustion engine as the water coolant for said engine.

6. In the method of up-grading the heating value quality of digester generated methane gas and using the up-graded gas as fuel in an internal combustion engine driving an electric generator to produce electric power as claimed in claim 5 wherein the raw digester generated methane gas is comprised of from about 50% to about 70% methane, from about 30% to about 50% carbon dioxide, and from about 5% to about 20% oxygen, water, ammonia and sulfur compounds.

7. In the method of up-grading the heating value quality of digester generated methane gas and using the up-graded gas as fuel in an internal combustion engine driving an electric generator to produce electric power as claimed in claim 5 wherein the overhead gas mixture of higher heating value quality removed from the absorption-type contact tower is expanded in an expander - generator system before utilization of said gas mixture as combustible fuel whereby the pressure of said mixture is reduced and electric power is generated by said expander - generator system.

8. In the method of up-grading the heating value quality of digester generated methane gas and using the up-graded gas as fuel in an internal combustion engine driving an electric generator to produce electric power as claimed in claim 5 wherein the bottoms absorbent - condensed gases stream, after the heating thereof, is expanded in an expander - generator system whereby the pressure thereof is reduced and electric power is generated by said expander - generator system.

9. In the method of up-grading the heating value quality of digester generated methane gas and using the up-graded gas as fuel in an internal combustion engine driving an electric generator to produce electric power as claimed in claim 8 wherein the reduced pressure absorbent - condensed gases stream is introduced to a desorber vessel wherein carbon dioxide gas and other absorbed gases are released from said absorbent.

10. In the method of up-grading the heating value quality of digester generated methane gas and using the up-graded gas as fuel in an internal combustion engine driving an electric generator to produce electric power as claimed in claim 5 wherein the overhead gas mixture of higher heating value quality removed from the absorption-type contact tower is reduced in pressure to not less than 2 to 5 atmospheres of pressure and is turbocharged to said engine.

11. A system for up-grading the heating value quality of digester generated methane gas by removing non-combustible carbon dioxide gas therefrom and for utilizing the up-graded methane gas as fuel in an internal combustion engine driving an electric generator to produce electric power comprising:

(a) means for mixing raw digester methane gas with cold water absorbent to form a relatively cold absorbent - gas mixture;

(b) compression means for substantially increasing the gas partial pressure of said absorbent - gas mixture;

(c) an absorption-type contact tower for receiving said pressurized absorbent - gas mixture and for scrubbing said mixture to separate methane gas and other non-condensible gases from said raw digester gas and to condense the carbon dioxide component and other condensible gases of said raw digester gas for absorption by said water absorbent;

(d) means for removing from the absorption-type contact tower the methane gas and other non-condensible gases as an overhead gas mixture of higher heating value quality and for reducing the pressure of said overhead gas mixture with respect to the pressure within said contact tower;

(e) a water-cooled internal combustion engine for driving an electric generator for producing electric power;

(f) means for introducing the reduced pressure overhead gas mixture to said internal combustion engine as the fuel therefor and for combusting said fuel therein to drive said engine;

(g) means for removing from the absorption-type contact tower the water absorbent with absorbed condensed carbon dioxide and other condensed gases as a relatively high pressure, cold bottoms absorbent - condensed gases stream, and means for heating and expanding said stream to reduce the pressure thereof and vaporize and release carbon dioxide gas and other absorbed gases from said absorbent;

(h) means for introducing water coolant to the cooling section of the water-cooled internal combustion engine to cool said engine with the attendant conversion of said coolant to saturated steam;

(i) an absorption type chiller unit for receiving a portion of the saturated steam produced in the cooling section of said engine and for generating refrigeration therein with the attendant cooling of said steam to form water condensate;

(j) an indirect heat exchanger unit for receiving a second portion of the saturated steam produced in the cooling section of said engine and for transferring the heat of said steam to the bottoms absorbent - condensed gases stream after the removal of said stream from said contact tower and before the expansion thereof to release carbon dioxide gas and other absorbed gases from said absorbent with the attendant cooling of said steam to form water condensate;

(k) means for receiving water condensate from the absorption type chiller unit and from the indirect heat exchanger unit and for returning said condensate to the cooling section of said engine as the water coolant for said engine; and (l) means for receiving the water absorbant after the vaporization and release therefrom of carbon dioxide gas and other absorbed gases and for transferring said absorbent to and through the absorption type chiller unit for cooling therein and thereafter to said mixing means as the cold water absorbent for mixing with raw digester methane gas.

12. A system for up-grading the heating value quality of digester generated methane gas and utilizing the up-graded gas as fuel in an internal combustion engine driving an electric generator to produce electric power as claimed in claim 11 wherein the means for removing methane gas and other non-condensible gases from the absorption type contact tower as an overhead gas mixture and for reducing the pressure of said mixture includes an expander - generator system wherein said mixture is expanded with the attendant reduction of the pressure of said mixture and whereby electric power is generated.

13. A system for up-grading the heating value quality of digester generated methane gas and utilizing the up-graded gas as fuel in an internal combustion engine driving an electric generator to produce electric power as claimed in claim 11 wherein the means for heating and expanding the bottoms absorbent - condensed gases stream removed from the absorption type contact tower includes an expander - generator system wherein, after said stream has been heated, it is expanded with the attendant reduction of the pressure of said stream and whereby electric power is generated.

14. A system for up-grading the heating value quality of digester generated methane gas and utilizing the up-graded gas as fuel in an internal combustion engine driving an electric generator to produce electric power as claimed in claim 13 wherein a desorber vessel is associated with the expander - generator system of the means for heating and expanding the bottoms absorbent - condensed gases stream for receiving the reduced pressure absorbent - condensed gases stream from said expander - generator system and wherein carbon dioxide gas and other absorbed gases are released from said absorbant.

15. A system for up-grading the heating value quality of digester generated methane gas and utilizing the up-graded gas as fuel in an internal combustion engine driving an electric generator to produce electric power as claimed in claim 11 wherein the compression means for substantially increasing the gas partial pressure of the relatively cold absorbent - gas mixture is a progressive cavity pump.

16. A system for up-grading the heating value quality of digester generated methane gas and utilizing the up-graded gas as fuel in an internal combustion engine driving an electric generator to produce electric power as claimed in claim 11 wherein the raw digester methane gas is derived from an organic waste landfill.

* * * * *